United States Patent [19]

Suzuki et al.

[11] Patent Number: 4,780,553

[45] Date of Patent: Oct. 25, 1988

[54] ELECTROPHOTOGRAPHIC TONER AND COMPOUNDS USEFUL FOR THE TONER

[75] Inventors: Nobuo Suzuki, Shobu; Kikuko Okamura; Genpei Sugiyama, both of Tokyo; Susumu Suzuka, Yono, all of Japan

[73] Assignee: Hodogaya Chemical Co., Ltd., Tokyo, Japan

[21] Appl. No.: 29,179

[22] Filed: Mar. 23, 1987

Related U.S. Application Data

[62] Division of Ser. No. 863,170, May 14, 1986, Pat. No. 4,683,188.

[30] Foreign Application Priority Data

May 28, 1985 [JP] Japan ............................... 60-113165

[51] Int. Cl.[4] ........................... C07F 9/00; C07F 9/06; C07F 11/00

[52] U.S. Cl. ......................................... 556/26; 556/28; 556/57

[58] Field of Search .............................. 556/26, 57, 28

[56] References Cited

U.S. PATENT DOCUMENTS

| | | | |
|---|---|---|---|
| 3,346,604 | 10/1967 | Roberts et al. | 556/26 UX |
| 4,406,837 | 9/1983 | Kroenke | 556/57 |
| 4,406,838 | 9/1983 | Kroenke | 556/57 |
| 4,406,840 | 9/1983 | Kroenke | 556/57 |
| 4,410,462 | 10/1983 | Kroenke | 556/57 |
| 4,410,463 | 10/1983 | Kroenke | 556/57 |
| 4,424,164 | 1/1984 | Kroenke | 556/57 |
| 4,425,279 | 1/1984 | Kroenke | 556/57 |
| 4,490,455 | 12/1984 | Hoffend et al. | 556/26 UX |

FOREIGN PATENT DOCUMENTS

| | | | |
|---|---|---|---|
| 0109273 | 2/1984 | European Pat. Off. | 556/26 UX |
| 0100087 | 9/1984 | European Pat. Off. | 556/26 UX |

OTHER PUBLICATIONS

G. Brauer, Handbuch der Praeparativen Anorganischen Chemie, vol. 3, 1981, pp. 1777, 1783.

T. Moeller, Inorganic Chemistry, A Modern Introduction, 1982, p. 537.

*Primary Examiner*—Paul F. Shaver
*Attorney, Agent, or Firm*—Oblon, Fisher, Spivak, McClelland & Maier

[57] ABSTRACT

A compound having the formula:

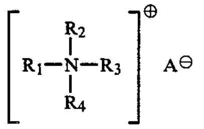

(I)

wherein each of $R_1$, $R_2$, $R_3$ and $R_4$ is a hydrogen atom, an alkyl group having from 1 to 22 carbon atoms, an unsubstituted or substituted aromatic group having from 6 to 20 carbon atoms and an aralkyl group having from 7 to 20 carbon atoms, and $A^{\ominus}$ is a molybdic acid anion, a tungstic acid anion or a heteropolyacid anion containing molybdenum or tungsten atoms.

7 Claims, No Drawings

ELECTROPHOTOGRAPHIC TONER AND COMPOUNDS USEFUL FOR THE TONER

This is a division of application Ser. No. 863,170, filed May 14, 1986, now U.S. Pat. No. 4,683,188.

The present invention relates to an electrophotographic toner and compounds useful for such a toner.

In electrophotography, it is common that an electrostatic latent image is formed on a photoconductive layer containing a photoconductive material, and the latent image is then developed with a powder developing agent to a visible image, which is then fixed by means of heat or a solvent.

As such a developing agent for electrophotography, a mixture is employed which comprises fine powder called a toner composed of a coloring agent and a resin, and fine glass beads or iron powder called a carrier.

The photoconductive layer can be electrified positively or negatively, so that when it is exposed under an original, an electrostatic image electrified either positively or negatively will be formed. When a negatively electrified electrostatic latent image is developed with a positively electrified toner, a positive image of the original will be obtained. However, when a positively electrified electrostatic latent image is developed with a negatively electrified toner, a negative image of the original where the black and white tones of the original are reversed, will be obtained.

Usually, a toner is a fine powder of a mixture of a synthetic resin and a coloring agent such as a dyestuff or a pigment. The electrification property of the toner is governed by the resin as the major component thereof. However, it is usually possible to obtain a desired frictional electrification property by an incorporation of a charge-controlling agent.

Conventional charge-controlling agents include pigments and dyestuffs such as oil black, Nigrosine (Japanese Examined Patent Publication No. 25669/1973), aniline black, crystal violet or metal-containing azo-dyestuffs. Further, as colorless charge-controlling agents, quaternary ammonium salts (Japanese Unexamined Patent Publication No. 119364/1982) and metal soaps are known. However, these charge-controlling agents have disadvantages such that they are likely to be decomposed or modified by humidity, heat, light or mechanical shock, and when they are incorporated in toners, the electrification properties are subject to change due to the change of the environment or during the use for a long period of time, whereby they are likely to give adverse effects to developed images.

It is an object of the present invention to provide a toner which overcomes such disadvantages.

The present invention provides a compound having the formula:

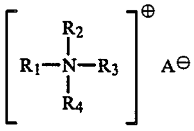

(I)

wherein each of $R_1$, $R_2$, $R_3$ and $R_4$ is a hydrogen atom, an alkyl group having from 1 to 22 carbon atoms, an unsubstituted or substituted aromatic group having from 6 to 20 carbon atoms and an aralkyl group having from 7 to 20 carbon atoms, and $A^\ominus$ is a molybdic acid anion, a tungstic acid anion or a heteropolyacid anion containing molybdenum or tungsten atoms.

Further, the present invention provides an electrophotographic toner containing such a compound. With respect to the toner of the present invention, the excellent effects which will be described hereinafter, are believed to be attributable particularly to the anion represented by $A^\ominus$ in the formula I.

Now, the present invention will be described in detail with reference to the preferred embodiments.

The alkyl group for $R_1$, $R_2$, $R_3$ and $R_4$ in the formula I, includes a methyl group, an ethyl group, a propyl group, a butyl group, a pentyl group, a hexyl group, an octyl group, a nonyl group, a decyl group, a dodecyl group, a tetradecyl group, a hexadecyl group, an octadecyl group and an eicosyl group.

The aromatic group for $R_1$, $R_2$, $R_3$ and $R_4$ includes a phenyl group, a naphthyl group, a tolyl group, a benzyl group, a p-chlorobenzyl group, a phenethyl group and an anthryl group.

As examples of the anion $A^\ominus$, there may be mentioned inorganic anions containing molybdenum or tungsten atoms such molybdic acid, tungstic acid, phosphomolybdic acid, silicomolybdic acid, phosphotungstic acid, silicotungstic acid, phosphotungstic-molybdic acid, silicotungstic-molybdic acid, phosphotungstic-molybdic acid, and chromomolybdic acid.

The compound of the formula I can readily be formed by mixing a quaternary ammonium chloride or bromide with molybdic acid or a molybdate, tungstic acid or a tungstate, or a salt of a heteropoly acid, in water, and can readily be isolated.

As the binder resin to be used in the present invention, there may be mentioned a homopolymer of styrene or substituted styrene such as a polystyrene or a polyvinyl toluene, a styrene-substituted styrene copolymer, a styrene-acrylate copolymer, a styrene-methacrylate copolymer, a styrene-acrylonitrile copolymer, a polyvinyl chloride, a polyethylene, a silicone resin, a polyester, a polyurethane, a polyamide, an epoxy resin, a modified rosin or a phenol resin.

The toner of the present invention may be prepared by melt-mixing the compound of the formula I to the synthetic resin in a weight ratio within a range of from 1 to 50%, solidifying the mixture, and then pulverizing it by a ball mill or by other pulverizers. Otherwise, it may be prepared by adding a polymerization initiator to the synthetic resin monomer, then adding the compound of the formula I in a weight ratio within a range of from 1 to 50% relative to the monomer, and polymerizing the mixture while suspending it in water. During the preparation, other coloring agents or carbon black may be added as the dyestuff. By the friction with a carrier, the toner thus prepared provides an electric charge suitable for the development of the static latent image, and even when the development is repeated, the electric charge can be maintained at a predetermined level. The charge distribution is uniform, and will be maintained at a constant state.

Further, the charge controlling agent according to the present invention presents an excellent electrification property even when used for a so-called one-component type toner containing magnetic iron powder.

Now, the present invention will be described in further detail with reference to Preparation Examples for the compounds and Working Examples for the toners. However, it should be understood that the present invention is by no means restricted by these specific Examples. In these Examples, "parts" means "parts by weight" unless otherwise specifically indicated.

PREPARATION EXAMPLE 1

$C_{16}H_{33}N^{\oplus}(CH_3)_3 1/6[Mo_7O_{24}]^{6\ominus}$ (Compound No. 1)

3.2 parts of tolymethylhexadecylammonium chloride is dissolved in 35 parts of water. Into this solution, an aqueous solution comprising 2.5 parts of ammonium molybdate and 12 parts of water, was poured. White precipitates thus formed were collected by filtration, thoroughly washed with water and then dried to obtain 3.5 parts of white crystals. The results of the elemental analysis are as shown below.

| | C (%) | H (%) | N (%) |
|---|---|---|---|
| Calculated values | 49.56 | 9.13 | 3.04 |
| Measured values | 49.50 | 9.00 | 3.10 |

PREPARATION EXAMPLE 2

$C_{18}H_{37}N^{\oplus}(CH_3)_3 1/10[H_2W_{12}O_{42}]^{10\ominus}$ (Compound No. 2)

3.5 parts of tolymethyloctadecylammonium chloride was dissolved in 40 parts of water. Into this solution, an aqueous solution comprising 3.2 parts of ammonium paratungstate and 20 parts of water, was poured. White precipitates thus formed were collected by filtration, washed with water and then dried to obtain 5.7 parts of white crystals. The results of the elemental analysis are as shown below.

| | C (%) | H (%) | N (%) |
|---|---|---|---|
| Calculated values | 42.16 | 7.76 | 2.34 |
| Measured values | 42.11 | 7.50 | 2.32 |

PREPARATION EXAMPLE 3

(Compound No. 3)

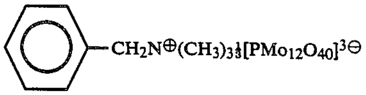

19 parts of tolymethylbenzylammonium chloride was dissolved in 200 parts of water. Into this solution, an aqueous solution comprising 70 parts of ammonium phosphomolybdate and 800 parts of water, was added. White precipitates thereby formed were collected by filtration and dried to obtain 73 parts of white crystals.. The results of the elemental analysis are as shown below.

| | C (%) | H (%) | N (%) | P (%) |
|---|---|---|---|---|
| Calculated values | 15.85 | 2.13 | 1.84 | 1.36 |
| Measured values | 15.73 | 2.10 | 1.83 | 1.20 |

PREPARATION EXAMPLE 4

$(C_4H_9)_4N^{\oplus} 1/3[PW_{12}O_{40}]^{3\ominus}$ (Compound No. 4)

11 parts of tetrabutylammonium chloride was dissolved in 100 parts of water. Into this solution, an aqueous solution comprising 100 parts of ammonium phosphotungstate and 500 parts of water, was poured. Precipitates thereby formed were collected by filtration and dried to obtain 120 parts of white crystals. The results of the elemental analysis are as shown below.

| | C (%) | H (%) | N (%) | P (%) |
|---|---|---|---|---|
| Calculated values | 15.65 | 2.96 | 3.42 | 0.84 |
| Measured values | 15.59 | 2.93 | 3.40 | 0.83 |

In a manner similar to the above Preparation Examples, the following compounds were prepared.

Preparation Example 5 (Compound No. 5)
$(CH_3)_4N^{\oplus} 1/6[Mo_7O_{24}]^{6\ominus}$ Preparation Example 6 (Compound No. 6)
$(C_4H_9)_3N^{\oplus}CH_3 \frac{1}{4}[SiW_{12}O_{40}]^{4\ominus}$ Preparation Example 7 (Compound No. 7)
$C_4H_9N^{\oplus}(CH_3)_3 1/5[BMo_{12}O_{40}]^{5\ominus}$ Preparation Example 8 (Compound No. 8)
$C_{10}H_{21}N^{\oplus}(CH_3)_3 1/6[Mo_7O_{24}]^{6\ominus}$ Preparation Example 9 (Compound No. 9)
$C_{16}H_{33}N^{\oplus}(CH_3)_3 1/6[H_2W_{12}O_{40}]^{6\ominus}$ Preparation Example 10 (Compound No. 10)
$C_{20}H_{41}N^{\oplus}(CH_3)_3 \frac{1}{4}[SiW_{12}O_{40}]^{4\ominus}$ Preparation Example 11 (Compound No. 11)

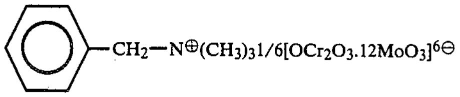

Preparation Example 12 (Compound No. 12)

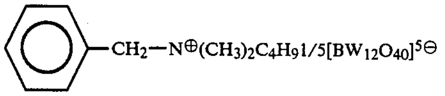

Preparation Example 13 (Compound No. 13)

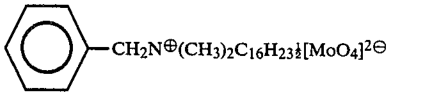

Preparation Example 14 (Compound No. 14)

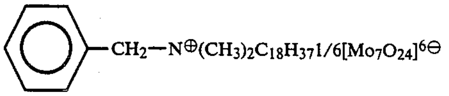

Preparation Example 15 (Compound No. 15)

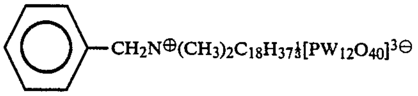

Preparation Example 16 (Compound No. 16)

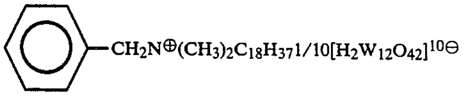

Preparation Example 17 (Compound No. 17)

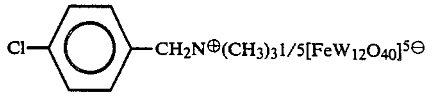

Peparation Example 18 (Compound No. 18)

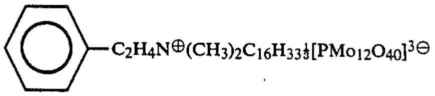

Preparation Example 19 (Compound No. 19)

-continued

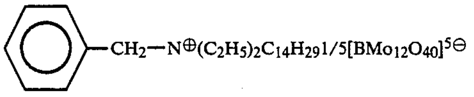

Preparation Example 20 (Compound No. 20)

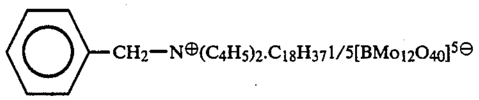

Preparation Example 21 (Compound No. 21)

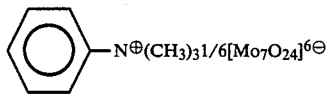

Preparation Example 22 (Compound No. 22)

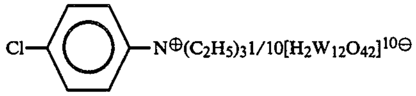

Preparation Example 23 (Compound No. 23)

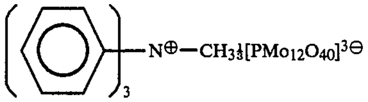

Preparation Example 24 (Compound No. 24)

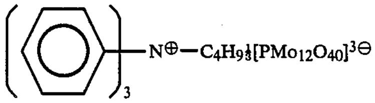

Preparation Example 25 (Compound No. 25)

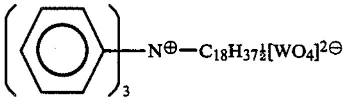

Preparation Example 26 (Compound No. 26)

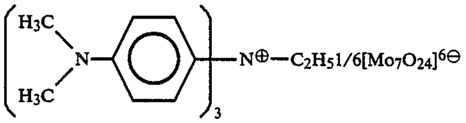

Preparation Example 27 (Compound No. 27)

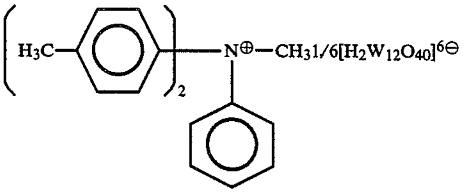

Preparation Example 28 (Compound No. 28)

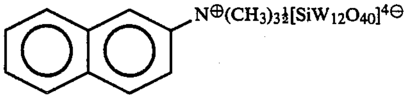

Preparation Example 29 (Compound No. 29)

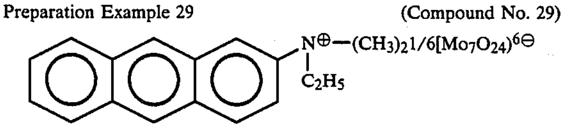

-continued

Preparation Example 30 (Compound No. 30)

$C_{16}H_{33}N^{\oplus}(CH_3)_3\frac{1}{4}[Mo_8O_{26}]^{4\ominus}$

Preparation Example 31 (Compound No. 31)

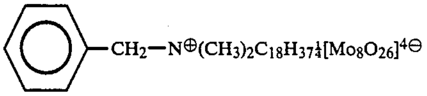

Preparation Example 32 (Compound No. 32)

$C_{18}H_{37}N^{\oplus}(CH_3)_3 1/7[PMo_{11}O_{39}]^{7\ominus}$

Preparation Example 33 (Compound No. 33)

$[C_{16}H_{33}N^{\oplus}(CH_3)_3]_4(N^{\oplus}H_4)_2[Mo_7O_{24}]^{6\ominus}$

Prepatation Example 34 (Compound No. 34)

$[C_{14}H_{37}N^{\oplus}(CH_3)_3]_3(N^{\oplus}H_4)_3[Mo_7O_{24}]^{6\ominus}$

Preparation Example 35 (Compound No. 35)

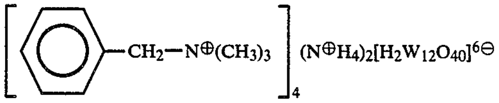

EXAMPLE 1

One part of Compound No. 1 of the formula $C_{16}H_{33}N^{\oplus}(CH_3)_3 1/6[Mo_7O_{24}]^{6\ominus}$ and 5 parts of carbon black were heat-kneaded with 100 parts of a styrene-n-butyl methacrylate copolymer. After cooling, the solidified mixture was roughly pulverized by a hammer mill and then finely pulverized by a jet pulverizer, followed by classification to obtain a powder having a particle size of from 10 to 15 μm. This black powder was mixed with an iron powder carrier in a weight ratio of 5:150 and shaked, whereby the toner was positively electrified, and the quantity of the electric charge was 23 μc/g. By using this toner, an image was reproduced by a commercially availabe photocopying machine, whereby copy images with a sharp image quality were obtained not only at the initial stage but also after the reproduction of 10,000 copies.

EXAMPLE 2

Two parts of Compound No. 4 of the formula $(C_4H_9)_4N^{\oplus}1/3[PW_{12}O_{40}]^{3\ominus}$ and 8 parts of carbon black, were kneaded with 150 parts of a styrene-ethylhexyl methacrylate copolymer, and the mixture was treated in the same manner as in Example 1 to obtain a black toner. This toner was electrified positively, and the quantity of the electric charge was 20 μc/g. By using this toner, an image was reproduced by a commercially available photocopying machine, whereby copy images with a good image quality were obtained not only at the initial stage but also after the reproduction of 10,000 copies.

EXAMPLES 3 to 35

The toners were prepared in the same manner as in Example 1 except that the compound was changed to those identified in Table 1. The results are also shown in Table 1.

TABLE 1

| Example No. | Compound No. | Electric charge of toner (μc/g) |
|---|---|---|
| 3 | 2 | 24 |
| 4 | 3 | 26 |
| 5 | 6 | 22 |
| 6 | 7 | 16 |
| 7 | 8 | 25 |

TABLE 1-continued

| Example No. | Compound No. | Electric charge of toner (μc/g) |
|---|---|---|
| 8 | 5 | 18 |
| 9 | 9 | 30 |
| 10 | 10 | 21 |
| 11 | 11 | 19 |
| 12 | 12 | 22 |
| 13 | 13 | 26 |
| 14 | 14 | 18 |
| 15 | 15 | 24 |
| 16 | 16 | 27 |
| 17 | 17 | 32 |
| 18 | 18 | 25 |
| 19 | 19 | 22 |
| 20 | 20 | 26 |
| 21 | 21 | 12 |
| 22 | 22 | 20 |
| 23 | 23 | 23 |
| 24 | 24 | 22 |
| 25 | 25 | 25 |
| 16 | 16 | 19 |
| 27 | 27 | 21 |
| 28 | 28 | 18 |
| 29 | 29 | 23 |
| 30 | 30 | 35 |
| 31 | 31 | 42 |
| 32 | 32 | 28 |
| 33 | 33 | 25 |
| 34 | 34 | 17 |
| 35 | 35 | 31 |

COMPARATIVE EXAMPLES 1 and 2

The toners were prepared in the same manner as in Example 1 except that instead of the quaternary ammonium compound used in Example 1, the quaternary ammonium compounds identified in Table 2 were used.

TABLE 2

| Comparative Example No. | Quaternary ammonium salts |
|---|---|
| 1 | 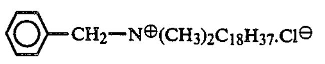 |
| 2 | 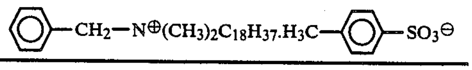 |

The quaternary ammonium salts used in Comparative Examples 1 and 2 are different from those used in Examples 14, 15 and 16 in the structures of anions. By using these toners, comparative tests were conducted with respect to the image qualities at the initial stage and after the reproduction of 10,000 copies and the image qualities obtained under a high temperature high humidity condition. The results are shown in Table 3, which indicate the superiority of the toners of the present invention.

TABLE 3

| | Image quality at the initial stage | Image quality after the reproduction of 10,000 copies | Image quality in an environment of 30° C. under a relative humidity of 80% |
|---|---|---|---|
| Example 14 | Good | Good | Good |
| Example 15 | " | " | " |
| Example 16 | " | " | " |
| Comparative Example 1 | " | Fogging | Fogging, low density |
| Comparative Example 2 | " | " | Fogging, low density |

Further, with respect to the toners obtained in Example 15 and Comparative Example 2, the changes in the electric charge during the shaking for a long period of time were measured. The results are shown in Table 4.

TABLE 4

| Shaking time | Initial stage | Electric charge (unit: μc/g) 30 min | 1 hr | 3 hrs | 4 hrs |
|---|---|---|---|---|---|
| Example 15 | 24 | 26 | 26.5 | 26 | 26 |
| Comparative Example 2 | 14 | 10 | 8 | 7 | 5 |

(Note: Shaking method: the toners obtained in the same manner as in Example 1 were placed in polypropylene containers, respectively, and shaked by a shaking machine which reciprocates about 100 times per minute.)

As shown in Table 4, as compared with the toner of Example 15, the toner of Comparative Example 2 has a low level of the electric charge, and its electric charge decreases as the shaking time passes, thus clearly indicating the superiority of the toner of the present invention.

We claim:

1. A compound having the formula:

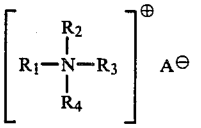 (I)

wherein each of $R_1$, $R_2$, $R_3$ and $R_4$ is a hydrogen atom, an alkyl group having from 1 to 22 carbon atoms, an unsubstituted or substituted aromatic group having from 6 to 20 carbon atoms and an aralkyl group having from 7 to 20 carbon atoms and wherein at least one of $R_1$, $R_2$, $R_3$ and $R_4$ is said aromatic or aralkyl group, and $A^-$ is a molybdic acid anion, a tungstic acid anion or a heteropolyacid anion containing molybdenum or tungsten atoms.

2. The compound which is $C_{16}H_{33}N^{\oplus}(CH_3)_3 1/6[Mo_7O_{24}]^{6\ominus}$.

3. The compound which is $C_{18}H_{37}N^{\oplus}(CH_3)_2.C_2H_5 1/10[H_2W_{12}O_{42}]^{10\ominus}$.

4. The compound which is $(C_4H_9)_4N^{\oplus} 1/3[PW_{12}O_{40}]^{3\ominus}$.

5. The compound which is

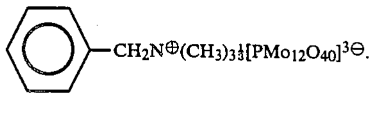

6. A compound selected from the group consisting of $(CH_3)_4N^{\oplus} 1/6[Mo_7O_{24}]^{6\ominus}$; $(C_4H_9)_3N^{\oplus}CH_3 1/4[SiW_{12}O_{40}]^{4\ominus}$; $C_4H_9N^{\oplus}(CH_3)_3 1/5[BMo_{12}O_{40}]^{5\ominus}$; $C_{10}H_{21}N^{\oplus}(CH_3)_3 1/6[Mo_7O_{24}]^{6\ominus}$; $C_{16}H_{33}N^{\oplus}(CH_3)_3 1/6[H_2W_{12}O_{40}]^{6\ominus}$; $C_{20}H_{41}N^{\oplus}(CH_3)_3 1/4[SiW_{12}O_{40}]^{4\ominus}$;

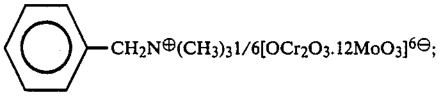
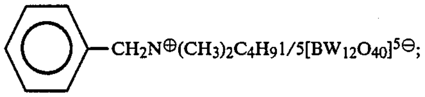
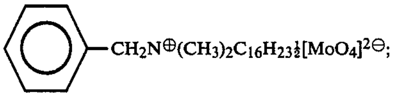
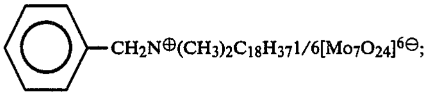
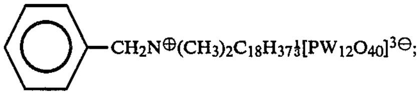
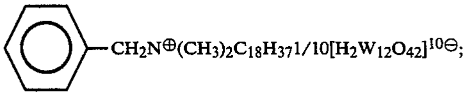
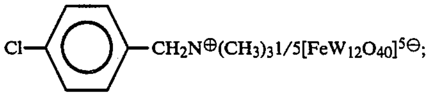
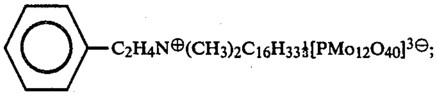
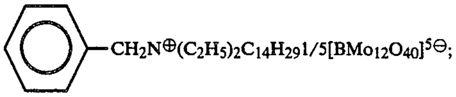
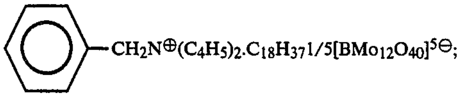
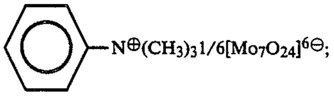
-continued
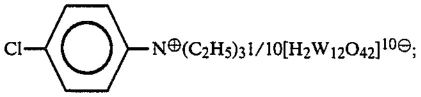
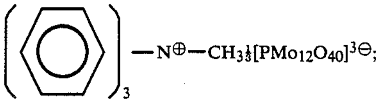
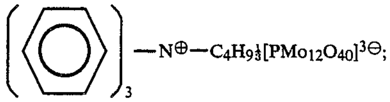
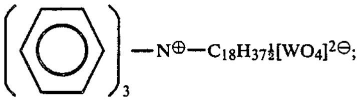
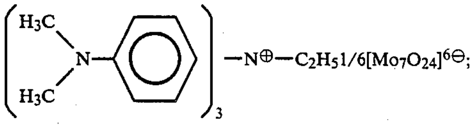
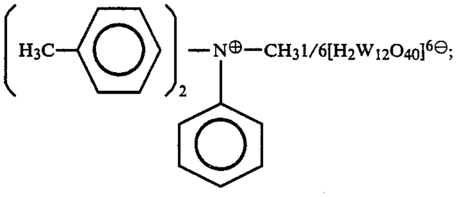
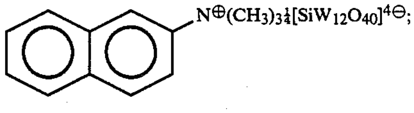
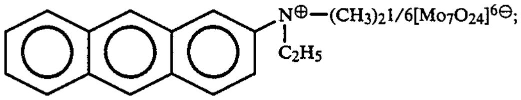
$C_{16}H_{33}N^{\oplus}(CH_3)_3\frac{1}{4}[Mo_8O_{26}]^{4\ominus}$;
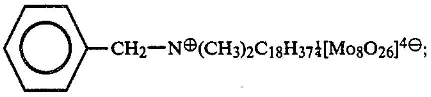
$C_{18}H_{37}N^{\oplus}(CH_3)_3 1/7[PMo_{11}O_{39}]^{7\ominus}$;
$[C_{16}H_{33}N^{\oplus}(CH_3)_3]_4(N^{\oplus}H_4)_2[Mo_7O_{24}]^{6\ominus}$;
$[C_{18}H_{37}N^{\oplus}(CH_3)_3]_3(N^{\oplus}H_4)_3[Mo_7O_{24}]^{6\ominus}$;
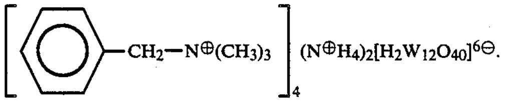
7. The compound having the formula $C_{16}H_{33}N^{+}(CH_3)_3 1/4[Mo_8O_{26}]^{4-}$.
* * * * *